(12) United States Patent
DeMaria

(10) Patent No.: US 10,870,190 B2
(45) Date of Patent: Dec. 22, 2020

(54) TOOL FOR EXTRACTING AND INSTALLING A SEAL FROM AN ENGINE HOUSING HAVING A SHAFT

(71) Applicant: Rooster Tools, Inc., Johns Island, SC (US)

(72) Inventor: John DeMaria, Johns Island, SC (US)

(73) Assignee: Rooster Tools, Inc., Johns Island, SC (US)

( * ) Notice: Subject to any disclaimer, the term of this patent is extended or adjusted under 35 U.S.C. 154(b) by 211 days.

(21) Appl. No.: 16/244,235

(22) Filed: Jan. 10, 2019

(65) Prior Publication Data

US 2020/0223039 A1 Jul. 16, 2020

(51) Int. Cl.
  *B25B 27/00* (2006.01)
  *B25B 27/06* (2006.01)
  *F16J 15/3268* (2016.01)

(52) U.S. Cl.
  CPC ........ *B25B 27/0028* (2013.01); *B25B 27/062* (2013.01); *F16J 15/3268* (2013.01); *Y10T 29/53657* (2015.01)

(58) Field of Classification Search
  CPC ............ B25B 27/0028; B25B 27/0035; B25B 27/0092; B25B 27/0085; B25B 27/02; B25B 27/06; B25B 27/28; Y10T 29/53657; Y10T 29/53628; Y10T 29/53683; Y10T 29/53796; Y10T 29/53839; Y10T 29/53843; Y10T 29/53883; B23B 47/28
  See application file for complete search history.

(56) References Cited

U.S. PATENT DOCUMENTS

| 3,257,716 | A |   | 6/1966  | Spytek |
| 3,564,696 | A | * | 2/1971  | Shepanski ........... B25B 27/0028 29/235 |
| 3,909,916 | A | * | 10/1975 | Neff .................... B25B 27/0028 29/235 |
| 5,528,809 | A | * | 6/1996  | Green .................... B25B 27/06 29/275 |

(Continued)

FOREIGN PATENT DOCUMENTS

| CN | 107435738 A | 12/2017 |
| CN | 207661143 U | 7/2018 |

(Continued)

*Primary Examiner* — Tyrone V Hall, Jr.
(74) *Attorney, Agent, or Firm* — Burr & Forman LLP; Hunter S. Freeman

(57) ABSTRACT

The present invention is a tool for extracting and installing a seal or gasket from an engine housing having a shaft such as an outboard boat motor having a propeller shaft. The present invention allows the seal to be removed from or installed around the shaft, without the need to remove or disassemble the engine housing. The present invention may include a central body portion, a first cylindrical body portion having a proximal end that is carried by the central body portion, a second cylindrical body portion having a proximal end that is carried by the central body portion, a bore hole that extends through the first cylindrical body portion, the central body portion and the second cylindrical body portion and a plurality of alignment holes for guiding a fastener to the seal without contacting the shaft so that the seal may be secured to the tool, the alignment holes.

20 Claims, 9 Drawing Sheets

(56) References Cited

U.S. PATENT DOCUMENTS 5,692,282 A * 12/1997 Baca .................. B25B 27/0028
29/235
2013/0067710 A1 * 3/2013 Williams ............ B25B 27/0028
29/275

FOREIGN PATENT DOCUMENTS

DE 102013011551 A1 3/2014
FR 2992247 B1 7/2014

* cited by examiner

TOOL FOR EXTRACTING AND INSTALLING A SEAL FROM AN ENGINE HOUSING HAVING A SHAFT

FIELD OF THE INVENTION

The present invention relates to a tool for extracting and installing a seal or gasket from an engine housing having a shaft such as a marine outdrive motor having a propeller shaft. The present invention allows the seal to be removed from or installed around the shaft, without damaging the shaft or other parts of the engine or the engine housing and without the need to remove or disassemble the engine housing.

DESCRIPTION OF RELATED ART

Ordinarily, when replacing or installing a seal surrounding an engine shaft, the engine housing must first be removed and/or disassembled to ensure that no part of the engine, the engine housing or the shaft is damaged during the removal seal and/or installation of a replacement seal. Otherwise, the user risks contacting and/or damaging vital parts with the tools that are needed to remove and/or install the seal.

To overcome this problem and, thus, to save time, prior art tools have been used to remove seals from around the shaft without the need to remove and/or disassemble the engine housing. These prior art tools use screws or bolts that come in contact with the engine or engine housing and must be rotated to remove the seal from within the engine housing and/or from around the shaft. This contact between the bolts or screws and the engine and/or engine housing increases the risk of damaging the engine or its housing.

These prior art tools also fail to provide alignment holes for securing the seal to the tool that are sufficiently stable and/or precisely located to ensure that the fastening member used to secure the seal to the prior art tool does not contact any portion of the engine, engine housing or shaft.

Also, these prior art tools fail to provide a means for installing a new seal using the same tool for removing the original seal.

Accordingly, it is an object of the present invention to provide a tool that does not require contact between any part of the engine, engine housing or shaft with a fastening member such as a screw or bolt in order to remove the seal.

It is a further object of the present invention to provide a tool that includes at least one alignment hole that is sufficiently stable and precisely located to ensure that the fastening used to secure the seal to the present invention does not contact any portion of the engine, engine housing or shaft.

It is a further object of the present invention to provide a tool that can both remove an old seal from an engine housing having a shaft and to install a replacement seal.

SUMMARY OF THE INVENTION

The above objectives are accomplished according to the present invention by providing a tool for removing a seal from an engine housing having a shaft, the tool comprising: a central body portion having a cylindrical shape, the central body portion having a first end, a second end and a first diameter; a first cylindrical body portion having a proximal end that is carried by the first end of the central body portion and a distal end that extends outwardly from the central body portion by a first length, wherein the first cylindrical body portion has a second diameter that is less than the first diameter of the central body portion; a second cylindrical body portion having a proximal end that is carried by the second end of the central body portion and a distal end that extends outwardly from the central body portion by a second length, wherein the second cylindrical body portion has a third diameter that is less than the first diameter of the central body portion; a bore hole that extends through the first cylindrical body portion, the central body portion and the second cylindrical body portion, the bore hole having a fourth diameter that is adapted to receive a shaft so that the tool may be placed around the shaft and adjacent to the seal; and, a plurality of alignment holes for guiding a fastener to the seal without contacting the shaft so that the seal may be secured to the tool, the alignment holes being disposed on the distal end of the second cylindrical body portion and extending through the central body portion and through the distal end of the first cylindrical body portion.

In at least one embodiment, both of the first cylindrical body portion and the second cylindrical body portion extend perpendicularly from the central body portion and the first length by which the distal end of the first cylindrical body portion extends outwardly from the central body portion is less than the second length by which the distal end of the second cylindrical body portion extends outwardly from the central body portion. In at least one embodiment, the length between the first end and the second end of the central body portion is greater than the first distance by which the distal end of the first cylindrical body portion extends outwardly from the central body portion. In at least one embodiment, the diameter of the first cylindrical body portion is the same as the diameter of the second cylindrical body portion.

In at least one embodiment, the plurality of alignment holes are located such that the distance between the plurality of alignment holes and an outer edge of the second cylindrical body portion is less than the distance between the plurality of alignment holes and an inner edge of the second cylindrical body portion that is defined by the bore hole. In at least one embodiment, the plurality of alignment holes includes a first set of corresponding alignment holes that are spaced from one another by 180 degrees. In at least one embodiment, the plurality of alignment holes includes a second set of corresponding alignment holes that are spaced from one another by 180 degrees, and the first set of corresponding alignment holes are spaced from the second set of corresponding alignment holes by a range of 1 to 90 degrees.

In at least one embodiment, the present invention comprises: an inner cylinder having a first distal end, a second distal end and an outer edge having an outer diameter; a bore hole defined in the inner cylinder and extending from the first distal end to the second distal end of the inner cylinder, the bore hole defining inner edge in the inner cylinder, the inner edge having an inner diameter; a central body portion carried by the inner cylinder and extending around at least a portion of the circumference of the inner cylinder such that a first length by which the first distal end of the inner cylinder extends outwardly from the central body portion is less than a second length by which the second distal end of the inner cylinder extends outwardly from the central body portion; and, a plurality of alignment holes for guiding a fastener to the seal without contacting the engine shaft so that the seal may be secured to the tool, wherein the alignment holes extend from the first distal end to the second distal end of the inner cylinder and are disposed between the outer edge and the inner edge of the inner cylinder.

In at least one embodiment, the central body portion includes an inner edge that extends around the entire circumference of the inner cylinder. In at least one embodiment, the distance between the inner edge and the outer edge of the central body portion is greater than the distance between the inner edge and the outer edge of the inner cylinder.

In at least one embodiment, the central body portion includes a first end portion and a second end portion and the length between the first end portion and the second end portion of the central body portion is greater than the first distance by which the first end of the inner cylinder extends outwardly from the central body portion.

In at least one embodiment, the plurality of alignment holes are located such that the distance between the plurality of alignment holes and the outer edge of the inner cylinder is less than the distance between the plurality of alignment holes and the inner edge of the inner cylinder. In at least one embodiment, the plurality of alignment holes includes a first set of corresponding alignment holes that are spaced from one another by 180 degrees. In at least one embodiment, the plurality of alignment holes includes a second set of corresponding alignment holes that are spaced from one another by 180 degrees and wherein the first set of corresponding alignment holes are spaced from the second set of corresponding alignment holes by a range of 1 to 90 degrees. In at least one embodiment, the first set of corresponding alignment holes have a diameter that is greater than the diameter of the second set of corresponding alignment holes.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1A:
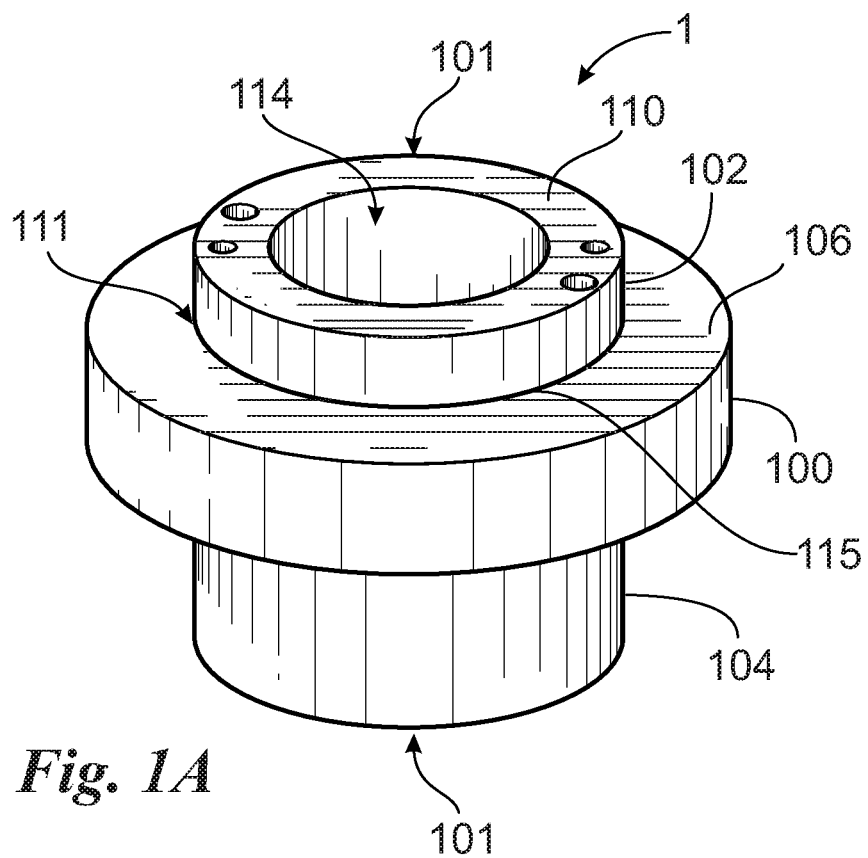
FIG. 1A shows a perspective view of an embodiment of the present invention.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 1B:
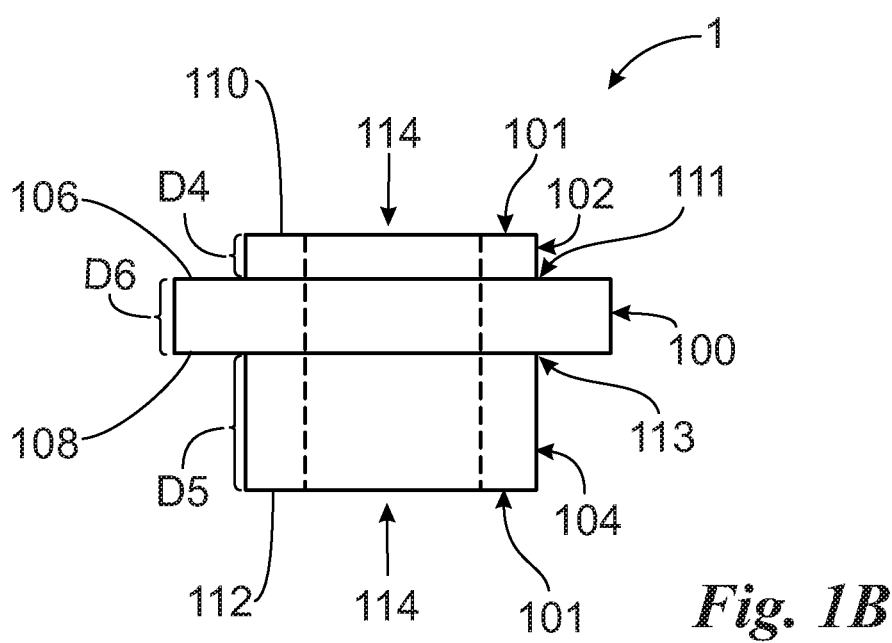
FIG. 1B shows a side elevation view of an embodiment of the present invention.
Figure 1C:
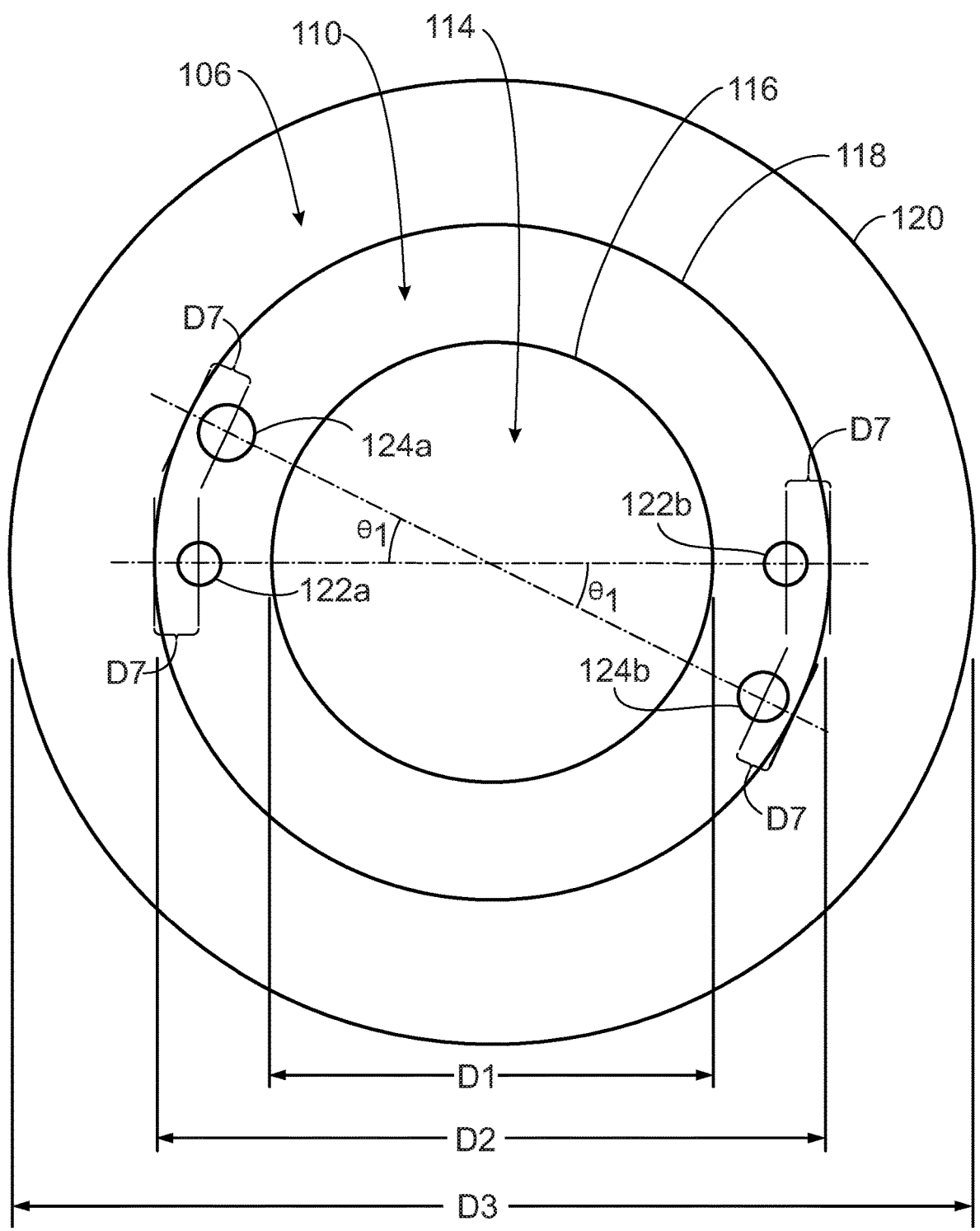
FIG. 1C shows a front plan view of an embodiment of the present invention.

Referring now to FIGS. 1A-1C, a first embodiment of the present invention can be seen generally as 1. In the shown embodiment, the invention includes a central body portion 100 that includes a first end 106 and a second end 108. The present invention further includes an inner cylinder 101. In one embodiment, the inner cylinder 101 comprises a first cylindrical body portion 102 and a second cylindrical body portion 104. In this embodiment, the first cylindrical body portion 102 includes a proximal end 111 that is carried by the first end 106 of the central body portion 100 and a distal end 110 that extends outwardly from said central body portion 100. Similarly, the second cylindrical body portion has a proximal end 113 that is carried by the second end 108 of the central body portion 100 and a distal end 112 that extends outwardly from said central body portion 100.

In alternate embodiments, however, the inner cylinder is made of a single piece such that the first cylindrical body portion 102 and the second cylindrical body portion 104 are integral with one another such that they do not have a proximal end (111 and 113 respectively) or their proximal ends are joined to one another such that the proximal ends (111 and 113 respectively) are not carried by the central body portion 100. In such an embodiment, the central body portion 100 has an inner edge 115 that extends around at least a portion of the circumference of the inner cylinder 101 as defined by the inner cylinder's outer edge 118.

The present invention further includes a bore hole 114 that extends through the tool along its longitudinal axis and preferably along its center line. Thus, the bore hole extends from the distal end 110 of the first cylindrical body portion to the distal end 112 of the second cylindrical body portion. The bore hole has a diameter D1, which is sufficiently large to allow the tool to be placed over top of and around a shaft (show as 202 in FIGS. 3-4). The bore hole 114 defines an inner edge 116 in the inner cylinder, including both the first cylindrical body portion 102 and the second cylindrical body portion 104. Both the first cylindrical body portion 102 and the second cylindrical body portion have an inner edge 116 that has an inner diameter that is equal to the diameter of the bore hole D1 as well as an outer edge 118 that has an outer diameter D2 that is less than the diameter D3 of the outer edge 120 of the central body portion 100. In the shown embodiment, the inner diameters D1 and the outer diameters D2 of the first cylindrical body portion 104 and the second cylindrical body portion are equal. In alternate embodiments, however, the inner diameters D1 and/or the outer diameters D2 could be different for the first cylindrical body portion 102 and the second cylindrical body portion 104. In at least one embodiment D1 is equal to 0.900 inches, D2 is equal to 1.310 inches and D3 is equal to 2.25 inches. In alternate embodiments, D1 could be any distance, including 1.070 inches, 1.210 inches, 1.460 inches and/or 1.63 inches. In alternate embodiments, D2 could be any distance, including 1.410 inches, 1.560 inches, 1.760 inches and/or 2.195 inches. Similarly D3 could be any distance but preferably is in a range of between 2 and 4 inches. As will be described below, D3 preferably is sufficient to allow the outer edge 120 of the central body portion 100 to overhang the shaft housing (shown as 212 in FIGS. 3-4).

In at least one embodiment, the distance D4 by which the distal end 110 of the first cylindrical body portion 102 extends outwardly from the central body portion 100 is less than the distance D5 by which the distal end 112 of the second cylindrical body portion 104 extends outwardly from the central body portion 100. As will be described more fully in FIGS. 3-4, the difference in these distances assists with the removal and installation of seals from the engine housing. In one embodiment, distance D4 is less than the distance D6 between the central body portion's first end 106 and second end 108. While distance D4 could be any number of distances, in at least one embodiment, D4 may be one of the following distances 0.160 inches, 0.185 inches, 0.199 inches or 0.200 inches. While distance D5 could be any number of distances, in at least one embodiment, D5 is in the range of 0.250-1.000 inches and is preferably 0.500 inches. While distance D6 could be any number of distances, in at least one embodiment, D6 is in the range of 0.160-1.000 inches and is preferably 0.250 inches.

The present invention further includes a plurality of alignment holes 122a, 122b, 124a and 124b. These alignment holes extend through the tool from distal end 112 of the second cylindrical body portion 104 to the distal end 110 of the first cylindrical body portion 102. In the shown embodiment, the present invention includes a first set of corresponding alignment holes 122a and 122b that have a diameter sufficient to receive a drill bit (shown as 206 in FIGS. 3-4) and to allow the drill bit to pierce the seal to be removed. In at least one embodiment the holes 122a and 122b in the first set of corresponding alignment holes may be spaced from one another by 180 degrees. In at least one embodiment, the present invention may include a second set of corresponding alignment holes 124a and 124b that have a diameter that is sufficient to receive a fastening member (shown as 210 in FIGS. 3-4) and to guide the fastening member to the seal so that the seal may be secured to the distal end 110 of the first cylindrical body portion 102. In this embodiment, the second set of corresponding alignment holes 124a and 124b may be spaced from one another by 180 degrees. Moreover, the angle $\Theta 1$ by which the first set of corresponding alignment holes 122a and 122b are spaced from the second set of corresponding alignment holes 124a and 124b is less than or equal to 90 degrees. In the shown embodiment, $\Theta 1$ is equal to 30 degrees. Because the first set of corresponding alignment holes 122a and 122b are intended to receive and guide a drill bit, these holes have a diameter that is less than the diameter of the second set of alignment holes 124a and 124b, which are intended to receive and guide a fastening member. In the embodiment shown in FIG. 1C, the first set of corresponding alignment holes 122a and 122b has a diameter of approximately 0.125 inches (⅛ inch) while the second set of corresponding alignment holes 124a and 124b has a diameter of approximately 0.172 inches (¹¹⁄₆₄ inch).

One of the purposes of the plurality of alignment holes 122a, 122b, 124a and 124b is to prevent the drill bit or the fastening member from contacting any portion of the engine, the engine housing or the shaft. Therefore, the alignment holes are located such that the distance D7 between the center of each of the alignment holes and the outer edge 118 of the distal end 110 of the first cylindrical body portion 102 is approximately 0.125 inches (⅛ inch). This placement ensures that neither the drill bit nor the fastening member will contact any portion of the engine, the engine housing or the shaft during use of the present invention. In alternate embodiments, the alignment holes could be spaced as close as 0.125 inches (⅛ inch) from the inner edge 116 of the distal end 110 of the first cylindrical body portion 102.

Figure 2A:
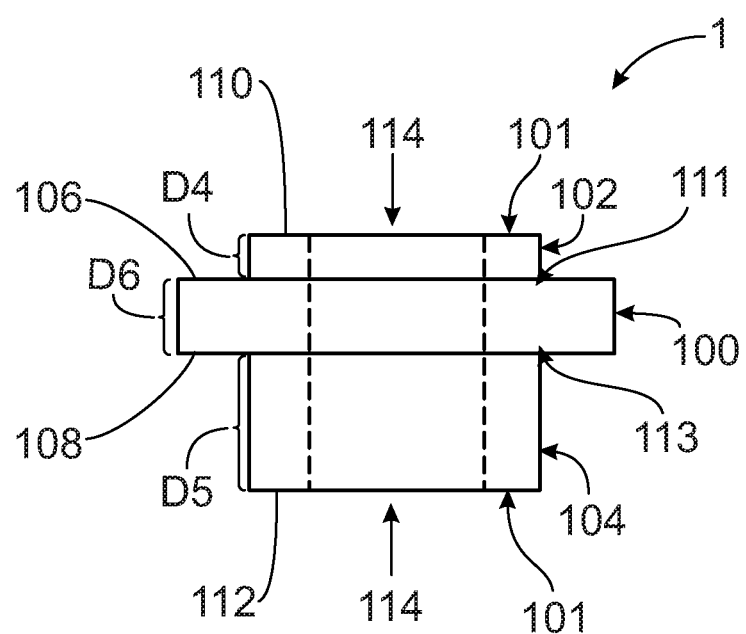
FIG. 2A shows a side elevation view of an embodiment of the present invention.
Figure 2B:
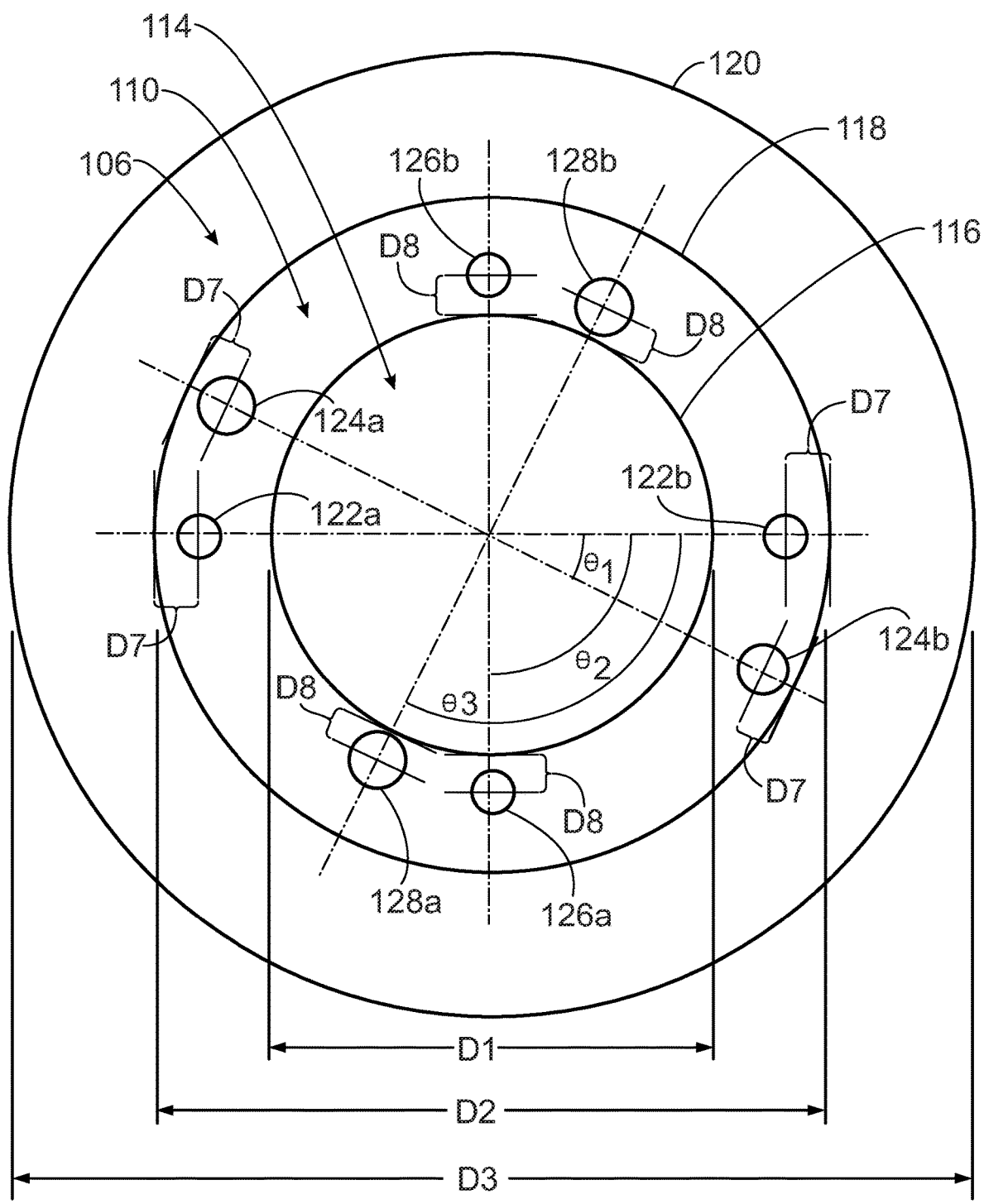
FIG. 2B shows a front plan view of an embodiment of the present invention.
Figure 3A:
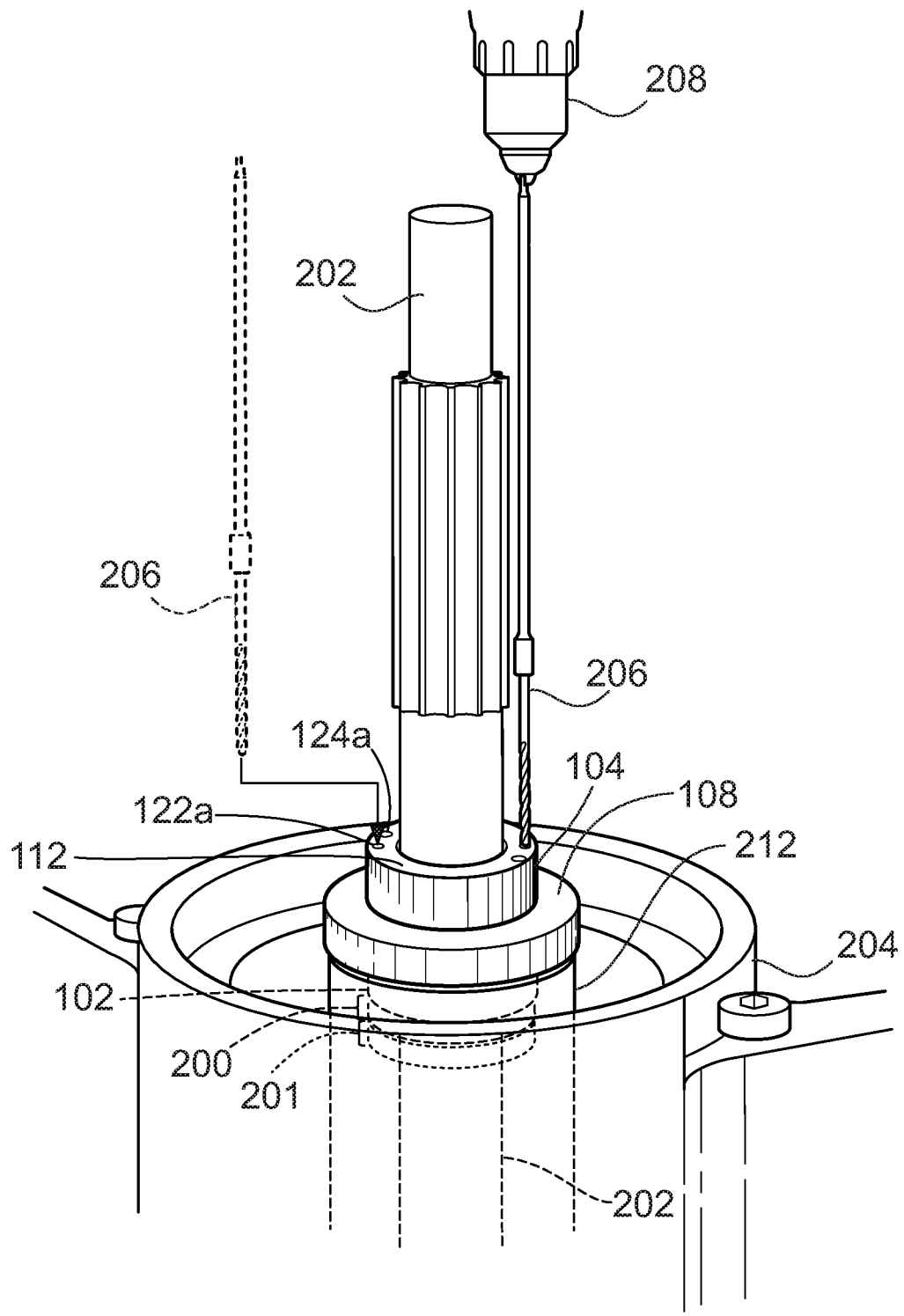
FIG. 3A shows a perspective view of an embodiment of the invention during use to remove a seal from an engine housing having a shaft.
Figure 3B:
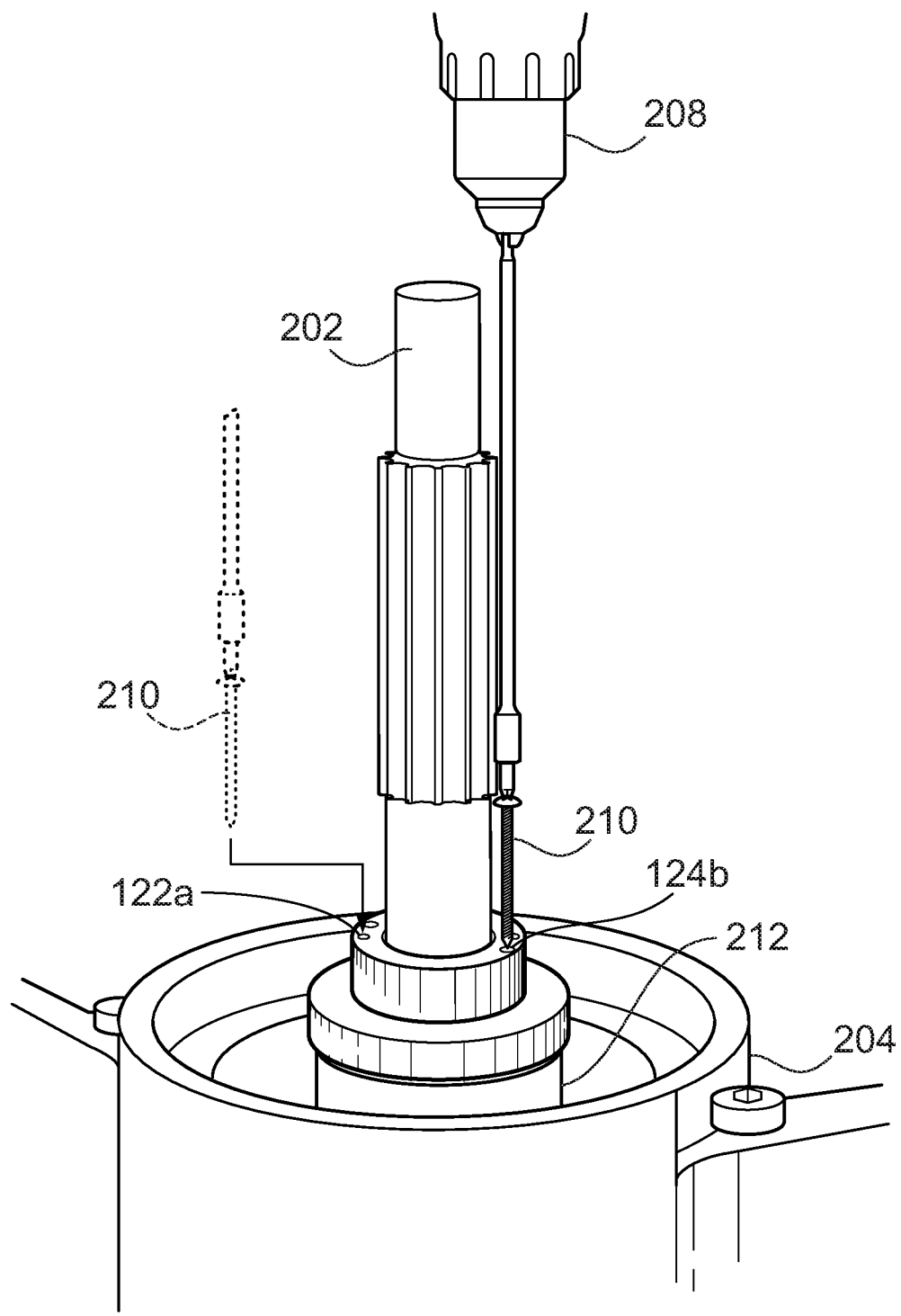
FIG. 3B shows a perspective view of an embodiment of the invention during use to remove a seal from an engine housing having a shaft.
Figure 3C:
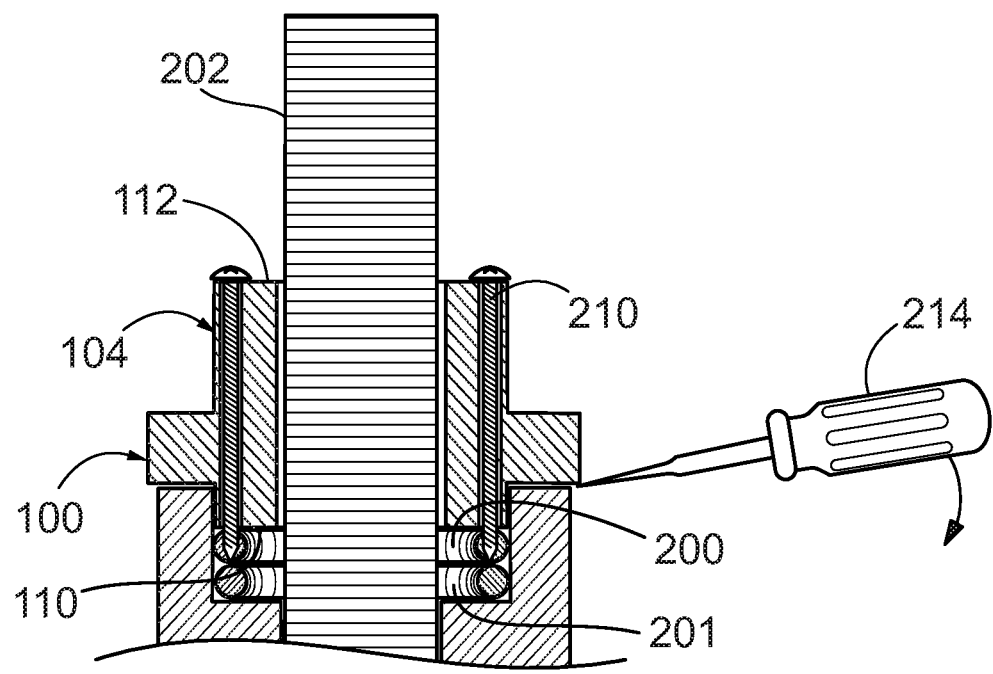
FIG. 3C shows a cross sectional view of an embodiment of the invention during use to remove a seal from an engine housing having a shaft.
Figure 3D:
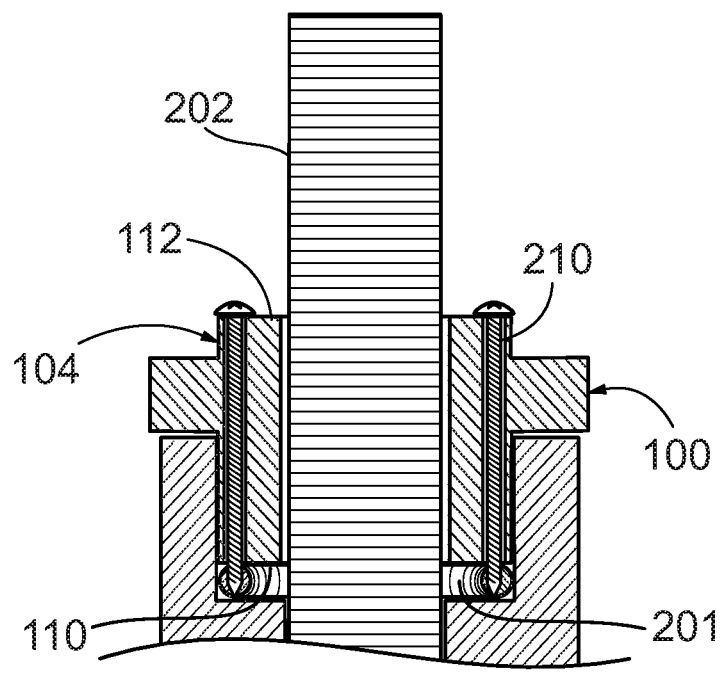
FIG. 3D shows a cross sectional view of an embodiment of the invention during use to remove a seal from an engine housing having a shaft.

Referring now to FIGS. 2A-2B, another embodiment of the invention can be seen generally as 1. Because much of this embodiment is the same as the embodiment discussed in FIGS. 1A-1C, that discussion will simply be incorporated by reference and will not be repeated in reference to FIGS. 2A-2B. Instead, this discussion will focus on the differences in certain distances, diameters and angles included in the two embodiments. In this embodiment, the diameter D1 is 1.21 inches; the outer diameter D2 is 1.76 inches; and the diameter D3 is 2.25 inches. In this embodiment, the distance D4 by which the distal end 110 of the first cylindrical body portion 102 extends from the central body portion 100 is approximately 0.185 inches. The distances D5 and D6 remain the same as the distances discussed in association with FIGS. 1A-1C.

In this embodiment, however, the tool includes four sets of corresponding alignment holes 122a-122b, 124a-124b, 126a-126b and 128a-128b. In this embodiment, each set of corresponding alignment holes are spaced 180 degrees from one another such that 122a is spaced 180 degrees from 122b, 124a is spaced 180 degrees from 124b, 126a is spaced 180 degrees from 126b, and 128a is spaced 180 degrees from 128b. In this embodiment, the angle $\Theta 1$ by which the first set of corresponding alignment holes 122a-122b is spaced from the second set of corresponding alignment holes 124a-124b is less than or equal to 90 degrees. In the shown embodiment, $\Theta 1$ is 30 degrees. In this embodiment, the angle $\Theta 2$ by which the first set of corresponding alignment holes 122a-122b is spaced from the third set of corresponding alignment holes 126a-126b is greater than or equal to 90 degrees. In the shown embodiment, $\Theta 2$ is 90 degrees. In the shown embodiment, the angle $\Theta 3$ by which the first set of corresponding alignment holes 122a-122b is spaced from the fourth set of corresponding alignment holes 128a-128b is greater than 90 degrees and in the shown embodiment is 120 degrees.

In this embodiment, the distance D7 between the outer edge 118 and the center of each of the alignment holes in the first and second set of corresponding alignment holes 122a, 122b, 124a and 124b is approximately 0.125 inches (⅛ inch). In this embodiment, the distance D8 between the inner edge 116 and the center of each of the alignment holes in the third and fourth set of corresponding alignment holes 126a, 126b, 128a and 128b is approximately 0.125 inches (⅛ inch). As discussed above, this distance helps ensure that neither the drill bit nor the fastening member contact any part of the engine, engine housing or the shaft. In this embodiment, the third and fourth set of corresponding alignment holes 126a, 126b, 128a and 128b are located closer to the inner edge 116 than to the outer edge 118 so that these holes can be used to secure a seal (shown as 201 in FIGS. 3-4) having a smaller diameter. In some cases, engines having a shaft use two seals—an outer seal 200 and an inner seal 201. Sometimes, the inner seal 201 has a diameter that is smaller than the diameter of the outer seal 200. In such instances, the tool preferably has four sets of corresponding alignment holes 122a-122b, 124a-124b, 126a-126b and 128a-128b, where the first and second set of corresponding alignment holes are spaced farther apart from one another than the spacing between the third and fourth set of corresponding alignment holes (i.e. 122a is spaced farther from 122b than 126a is spaced from 126b).

Referring now to FIGS. 3A-3D, use of the tool to remove a seal can be seen. To remove the outer seal 200 from around the shaft 202 without removing or otherwise disassembling the engine housing 204, first the tool 1 must be placed on the shaft 202 so that the bore hole 114 receives and surrounds the shaft 202 and the first cylindrical body portion 102 faces down towards the seal 200 to be removed. Next, the tool 1 is slid down the shaft 200 until the distal end 110 of the first cylindrical body portion 102 is placed adjacent to or in contact with the outer seal 200. When the tool is properly positioned adjacent to the outer seal 200, the first end 106 of the central body portion 100 will be adjacent to or in contact with the shaft housing 212 in which the outer seal 200 is located. The distance D4 by which the distal end 110 of the first cylindrical body portion 102 extends outwardly from the first end 106 of the central body portion 100 is sufficient to allow the distal end 110 to be adjacent to or in contact with the outer seal 200 to be removed.

Once the tool is properly placed, the first set of alignment holes 122a and 122b can be used to guide a drill bit 206 (preferably powered by a drill 208) to the outer seal 200 so that the seal can be pierced without contacting or damaging any part of the engine, the engine housing 204 and 212 or the shaft 202. Once the outer seal 200 has been pierced by the drill bit 206, the tool can be rotated to place the second set of corresponding alignment holes 124a and 124b directly above the hole drilled in the seal. In at least one embodiment, this rotation should correspond with $\Theta 1$, which is 30 degrees. Next, a fastening member 210 such as a screw, bolt or the like, can be inserted into the second set of corresponding alignment holes and used to secure (or screw) the outer seal 200 to the distal end 110 of the first cylindrical body portion 102. Once the outer seal 200 has been secured to the tool 1, the tool can be forced upwards. As the tool is moved upwards and removed from around the shaft, the seal is removed. This upward force may be achieved by gripping and pulling (and/or twisting) the second cylindrical body portion 104 upwards or by using a prying tool 214 (such as a flat head screw driver, crow bar or the like) that is placed beneath the central body portion 100 and used to lift the central body portion 100 upwards. When using a prying tool, the prying tool 214 can be placed beneath the central body portion 100, which preferably has a diameter that is greater than the diameter of the shaft housing 212 and, therefore, overhangs the shaft housing. Once in place, the prying tool can be used to lift the tool without contacting or damaging the shaft housing 212.

Because the seal can be removed by lifting the the tool upwards, it is advantageous for the distance D4 by which the distal end 110 of the first cylindrical body portion 102 is sufficient to allow the distal end to be closely adjacent to the seal 200 while the central body portion is in contact with or closely adjacent to the shaft housing 212 so that the prying tool 214 can be used to either pry or lift the central body portion 100 upwards to remove the seal. It is also advantageous for the distance D5 by which the distal end 112 of the second cylindrical body portion 104 to be greater than D4 so as to allow the user to grip the second cylindrical body portion 104 in an effort to pull the tool upwards.

Often times, an engine has two seals, an outer seal 200 and an inner seal 201, which are placed at different depths within the shaft housing 212. In such instances, the second cylindrical body portion 104 can be used to remove the inner seal 201 that is located deeper inside of the shaft housing. To remove the inner seal 201, the tool is placed such that the bore hole 114 receives the shaft 202 such that the distal end 112 of the second cylindrical body portion 104 is facing downwards towards the inner seal 201 to be removed. The greater distance D5 allows the distal end 112 of the second cylindrical body portion 104 to be in contact with or closely adjacent to the inner seal 201 while the central body portion 100 is in contact with or closely adjacent to the shaft housing 212. Once the tool is in place, the inner seal 201 may be removed in much the same manner as the outer seal 200 was removed.

Figure 4A:
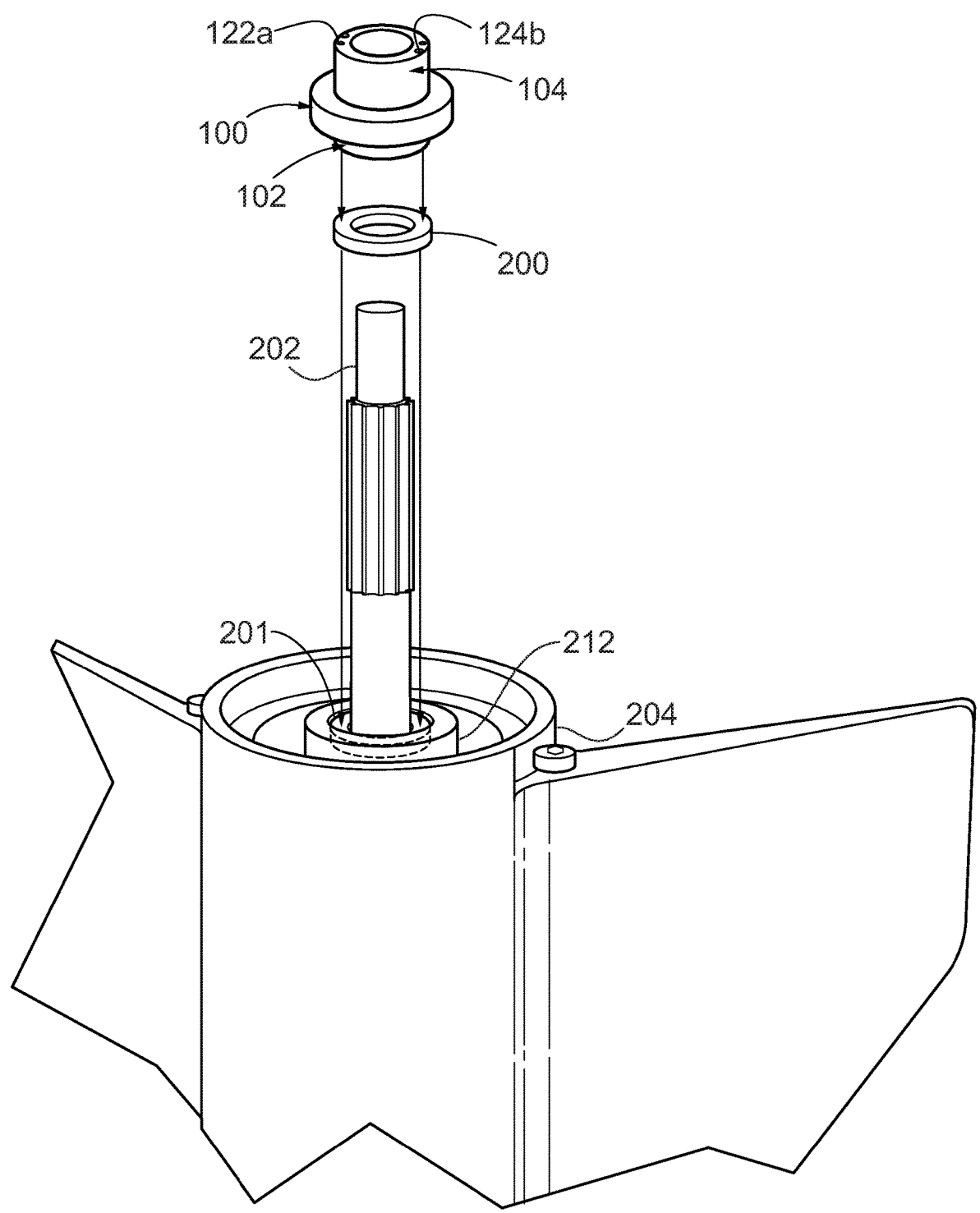
FIG. 4A shows a perspective view of an embodiment of the invention during use to install a seal from an engine housing having a shaft.
Figure 4B:
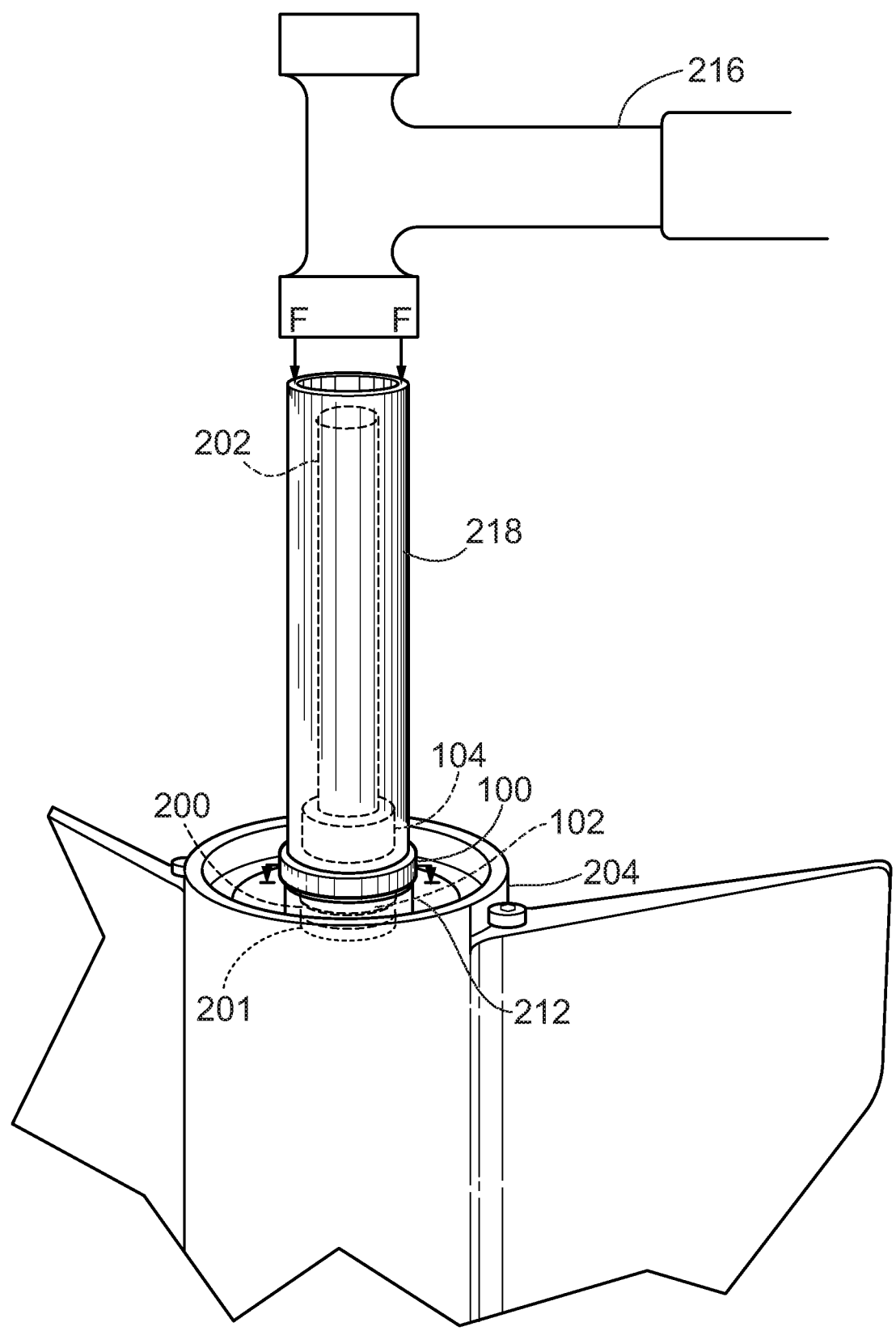
FIG. 4B shows a perspective view of an embodiment of the invention during use to install a seal from an engine housing having a shaft.

Referring now to FIGS. 4A-4B, use of the tool to install a seal can be seen. To install a seal, the replacement seal 201 is placed around the shaft 202 and into the shaft housing 212. Once the seal is in place, the tool 1 is placed so that the bore hole 114 is placed over and around the shaft so that the distal end 110 of the first cylindrical body portion 102 is facing downward toward the seal to be installed. Once the tool 1 is in place and the distal end 110 is in contact with or closely adjacent to the inner seal 201, a hammering tool 216, such as a hammer, mallet or the like, may then be used to force the inner seal 201 down into the shaft housing 212 and into place. Because the shaft 202 will often obstruct the hammering tool 214, it will often be necessary or advantageous to use a hollow conduit 218 such as a metal pipe that can be fit around the shaft 202 and placed in contact with the central body portion 100. Once the hollow conduit 218 is in place, the hammer may then be used to hit the conduit, thus forcing the distal end 110 of the first cylindrical body portion 102 down into the shaft housing and the inner seal 201 into place. In instances where the engine includes two seals, the outer seal 200 can be placed around the shaft 202 and into the shaft housing 212 and the same process can be repeated. In this case, the distal end 110 of the first cylindrical body portion 102 will force the outer seal 200 downward, which will in turn force the inner seal 201, further down into the shaft housing. This will insure that the two seals stay close to one another, thus forming a tight seal.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A tool for removing a seal from an engine housing having a shaft, said tool comprising:
    a central body portion having a cylindrical shape, said central body portion having a first end, a second end and a first diameter;
    a first cylindrical body portion having a proximal end that is carried by said first end of said central body portion and a distal end that extends outwardly from said central body portion by a first length, wherein said first cylindrical body portion has a second diameter that is less than said first diameter of said central body portion;
    a second cylindrical body portion having a proximal end that is carried by said second end of said central body portion and a distal end that extends outwardly from said central body portion by a second length, wherein said second cylindrical body portion has a third diameter that is less than said first diameter of said central body portion;
    a bore hole that extends through said first cylindrical body portion, said central body portion and said second cylindrical body portion, said bore hole having a fourth diameter that is adapted to receive a shaft so that said tool may be placed around the shaft and adjacent to the seal; and,
    a plurality of alignment holes for guiding a fastener to the seal without contacting the shaft so that the seal may be secured to said tool, said alignment holes being disposed on said distal end of said second cylindrical body portion and extending through said central body portion and through said distal end of said first cylindrical body portion.

2. The tool of claim 1 wherein said first length by which said distal end of said first cylindrical body portion extends outwardly from said central body portion is less than said second length by which said distal end of said second cylindrical body portion extends outwardly from said central body portion.

3. The tool of claim 1 wherein both of said first cylindrical body portion and said second cylindrical body portion extend perpendicularly from said central body portion.

4. The tool of claim 1 wherein the second diameter of said first cylindrical body portion is the same as the third diameter of said second cylindrical body portion.

5. The tool of claim 1 wherein the length between said first end and said second end of said central body portion is greater than said first distance by which said distal end of said first cylindrical body portion extends outwardly from said central body portion.

6. The tool of claim 1 wherein said plurality of alignment holes are located such that the distance between said plurality of alignment holes and an outer edge of said second cylindrical body portion is less than the distance between said plurality of alignment holes and an inner edge of said second cylindrical body portion that is defined by said bore hole.

7. The tool of claim 1 wherein said plurality of alignment holes includes a first set of corresponding alignment holes that are spaced from one another by 180 degrees.

8. The tool of claim 1 wherein said plurality of alignment holes includes a second set of corresponding alignment holes that are spaced from one another by 180 degrees, said first set of corresponding alignment holes are spaced from said second set of corresponding alignment holes by a range of 1 to 90 degrees.

9. A tool for removing a seal from an engine housing having a shaft, said tool comprising:
    An inner cylinder having a first distal end, a second distal end and an outer edge having an outer diameter;
    a bore hole defined in said inner cylinder and extending from said first distal end to said second distal end of said inner cylinder, said bore hole defining inner edge in said inner cylinder, said inner edge having an inner diameter;
    a central body portion carried by said inner cylinder and extending around at least a portion of the circumference of said inner cylinder such that a first length by which said first distal end of said inner cylinder extends outwardly from said central body portion is less than a second length by which said second distal end of said inner cylinder extends outwardly from said central body portion; and,
    a plurality of alignment holes for guiding a fastener to the seal without contacting the engine shaft so that the seal may be secured to said tool, wherein said alignment holes extend from said first distal end to said second distal end of said inner cylinder and are disposed between said outer edge and said inner edge of said inner cylinder.

10. The tool of claim 9 wherein said central body portion includes an inner edge that extends around the entire circumference of said inner cylinder.

11. The tool of claim 10 wherein the distance between said inner edge and said outer edge of said central body portion is greater than the distance between said inner edge and said outer edge of said inner cylinder.

12. The tool of claim 9 wherein said central body portion includes a first end portion and a second end portion and the length between said first end portion and said second end portion of said central body portion is greater than said first distance by which said first end of said inner cylinder extends outwardly from said central body portion.

13. The tool of claim 9 wherein said plurality of alignment holes are located such that the distance between said plurality of alignment holes and said outer edge of said inner cylinder is less than the distance between said plurality of alignment holes and said inner edge of said inner cylinder.

14. The tool of claim 9 wherein said plurality of alignment holes includes a first set of corresponding alignment holes that are spaced from one another by 180 degrees.

15. The tool of claim 14 wherein said plurality of alignment holes includes a second set of corresponding alignment holes that are spaced from one another by 180 degrees and wherein said first set of corresponding alignment holes are spaced from said second set of corresponding alignment holes by a range of 1 to 90 degrees.

16. The tool of claim 15 wherein said first set of corresponding alignment holes have a diameter that is greater than the diameter of said second set of corresponding alignment holes.

17. A tool for removing a seal from an engine housing having a shaft, said tool comprising:
    a central body portion having a cross-sectional shape that is generally circular, a first end, a second end and a first diameter;
    a first cylindrical body portion having a proximal end that is carried by said first end of said central body portion and a distal end that extends outwardly from said central body portion by a first length, wherein said first cylindrical body portion has a second diameter that is less than said first diameter of said central body portion;
    a second cylindrical body portion having a proximal end that is carried by said second end of said central body portion and a distal end that extends outwardly from said central body portion by a second length that is greater than said first length by which said distal end of said first cylindrical body portion extends from said central body portion, wherein said second cylindrical body portion has a third diameter that is equal to said second diameter of said first cylindrical body portion;
    a bore hole that extends through said first cylindrical body portion, said central body portion and said second cylindrical body portion, wherein said bore hole has a fourth diameter that is adapted to receive a shaft so that said tool may be placed around the shaft and adjacent to the seal and said bore hole defines an inner edge on said distal end on said first cylindrical body portion and on said distal end of said second cylindrical body portion;
    a plurality of alignment holes for guiding a fastener to the seal without contacting the shaft so that the seal may be secured to said tool, wherein said alignment holes extend through said second cylindrical body portion, said central body portion and said first cylindrical body portion and are located such that the distance between said plurality of alignment holes and an outer edge of said second cylindrical body portion is less than the distance between said plurality of alignment holes and said inner edge of said second cylindrical body portion.

18. The tool of claim 17 wherein the length between said first end and said second end of said central body portion is greater than said first length by which said distal end of said first cylindrical body portion extends outwardly from said central body portion but is less than said second length by which said distal end of said second cylindrical body portion extends outwardly from said central body portion.

19. The tool of claim 17 wherein said plurality of alignment holes includes a first set of corresponding alignment holes that are spaced from one another by 180 degrees.

20. The tool of claim 8 wherein said plurality of alignment holes includes a second set of corresponding alignment holes that are spaced from one another by 180 degrees, said first set of corresponding alignment holes are spaced from said second set of corresponding alignment holes by a range of 1 to 90 degrees.

* * * * *